(12) United States Patent
Schmuhl et al.

(10) Patent No.: US 7,112,047 B2
(45) Date of Patent: Sep. 26, 2006

(54) INFINITELY ADJUSTABLE CALIBRATION SLEEVE FOR EXTRUDED PLASTIC PIPES

(75) Inventors: Jörg Schmuhl, Königs-Wusterhausen (DE); Reinhard Klose, Rinteln (DE)

(73) Assignee: INOEX GmbH, Bad Oeynhausen (DE)

( * ) Notice: Subject to any disclaimer, the term of this patent is extended or adjusted under 35 U.S.C. 154(b) by 0 days.

(21) Appl. No.: 11/335,742

(22) Filed: Jan. 20, 2006

(65) Prior Publication Data
US 2006/0159796 A1    Jul. 20, 2006

(30) Foreign Application Priority Data
Jan. 20, 2005    (DE) .................... 10 2005 002 820

(51) Int. Cl.
  *B29C 47/90*    (2006.01)
  *B29C 47/94*    (2006.01)
(52) U.S. Cl. ........................ 425/68; 425/69; 425/70; 425/71; 425/72.1; 425/326.1; 425/388; 425/392
(58) Field of Classification Search .................. 425/68, 425/69, 70, 71, 72.1, 325, 326.1, 387.1, 388, 425/392
See application file for complete search history.

(56) References Cited

U.S. PATENT DOCUMENTS

| | | | |
|---|---|---|---|
| 2,981,975 A | | 5/1961 | Steierman .................... 425/113 |
| 3,600,488 A | | 8/1971 | Yazawa ........................ 425/392 |
| 3,904,334 A | * | 9/1975 | Yazawa et al. ................ 425/71 |
| 4,408,970 A | * | 10/1983 | Bustin et al. ............... 425/72.1 |
| 4,453,907 A | * | 6/1984 | Taguchi .................... 425/326.1 |
| 4,650,407 A | * | 3/1987 | Taguchi ...................... 425/72.1 |
| 4,655,988 A | | 4/1987 | Shinmoto et al. ........... 264/566 |
| 4,784,597 A | * | 11/1988 | Akane ....................... 425/326.1 |
| 5,891,481 A | * | 4/1999 | Pedersen ..................... 425/71 |
| 6,946,094 B1 | * | 9/2005 | Shober ..................... 425/326.1 |
| 2006/0051447 A1 | * | 3/2006 | Schmuhl et al. ......... 425/326.1 |

FOREIGN PATENT DOCUMENTS

| | | |
|---|---|---|
| DE | 26 16 197 A1 | 10/1976 |
| DE | 44 08 064 C1 | 9/1995 |
| DE | 198 43 340 C2 | 4/2000 |
| DE | 200 00 872 U1 | 7/2000 |
| DE | 200 23 052 U1 | 12/2002 |

(Continued)

OTHER PUBLICATIONS

German Office Action dated Oct. 26, 2005 in German Application No. 10 2005 002 820.9-16, filed Jan. 20, 2005(3 pages).

*Primary Examiner*—Yogendra N. Gupta
*Assistant Examiner*—Joseph Leyson
(74) *Attorney, Agent, or Firm*—Shlesinger, Arkwright & Garvey LLP

(57) ABSTRACT

Infinitely adjustable calibration sleeve for extruded plastic pipes includes an inlet head and two strap layers that intersect like a lattice grate and that are linked with each other at the crossing points. In that manner, the inlet head and the strap layers are adjustable to the pipe diameter, and the inlet head has radially adjustable overlapping segments in a radial plane distributed over the perimeter of the plastic pipe to be calibrated, and the segments mesh and have slots in their overlapping areas. Further, the faces of the segments are configured to lie on the plastic pipe to be calibrated, and the strap layers are linked to the segments flush with the faces. Such a calibration sleeve effectively seals the vacuum tank from the environment and prevents deformations of the entering, extruded plastic pipe.

8 Claims, 4 Drawing Sheets

FOREIGN PATENT DOCUMENTS

| | | |
|---|---|---|
| DE | 102 06 276 A1 | 9/2003 |
| DE | 20 2004 008 107 U1 | 9/2004 |
| DE | 10 2004 029 498 B3 | 10/2005 |
| EP | 1 157 805 A1 | 11/2001 |
| WO | 2004/091891 | 10/2004 |

* cited by examiner

INFINITELY ADJUSTABLE CALIBRATION SLEEVE FOR EXTRUDED PLASTIC PIPES

CROSS-REFERENCE TO RELATED APPLICATION

This application claims priority of German application no. 10 2005 002 820.9, filed Jan. 20, 2005, which is incorporated herein by reference.

FIELD OF THE INVENTION

The invention relates to an infinitely adjustable calibration sleeve for extruded plastic pipes with an inlet head and an adjacent component with a changeable inner width that surrounds and supports the plastic pipe. More particularly, the invention relates to an infinitely adjustable calibration sleeve for extruded plastic pipes with an inlet head and a further component with a changeable inner width that surrounds, supports, and is adjustable relative to the plastic pipes.

BACKGROUND OF THE INVENTION

Calibration sleeves are known from the state-of-the-art whose inner diameter can be changed within a narrow range during operation. The inner diameter of the calibration sleeve is changeable for the purpose of manufacturing plastic pipes within required tolerances taking into account shrinkage of the plastic due to various factors. Examples of such calibration shells are found in DE 44 08 064 C1, DE-OS 26 16 197, DE 200 00 872 U1, DE 200 23 052 U1, EP 1 157 805 A1 and U.S. Pat. No. 2,981,975 to Steierman.

DE 198 43 340 C2 describes a calibration sleeve whose inner diameter can be adjusted during operation for plastic pipes with different outer diameters. This takes into account the fact that batches within orders are becoming increasingly small under today's production conditions, i.e., the extrusion systems have to be continuously adjusted. These adjustments lead to extrusion system downtime, require a great deal of labor to change the individual parts, and cause loss of plastic material. The calibration sleeve in DE 198 43 340 C2 has numerous rings of blades, and the individual blades of each ring are radially adjustable and overlap from radial plane to radial plane and closely adjoin each other at the overlapping areas. This creates an essentially tubular body that abuts the outside of an extruded plastic pipe, and its diameter is adjustable to adapt to the pipe diameter to be produced. The construction of this known calibration sleeve is relatively complex. In addition, a precisely circular cross-sectional plastic pipe cannot be fabricated with this calibration sleeve.

WO 2004/091891 A1 also describes a calibration sleeve that is adjustable during operation to the different external diameters of plastic pipes to be manufactured. This calibration sleeve possesses an inlet head to which two layers of flexible straps are attached. These straps cross each other like a lattice grate and are linked to each other at their crossing points. The calibration of the calibration sleeve needed for the inner diameter of the extruded plastic pipe is changed by pulling apart or compressing the lattice grate. This calibration sleeve is distinguished by a large adjustment range with high intrinsic strength. In addition, the numerous intersecting linked straps form an absolutely circular calibration sleeve with each adjusted diameter.

OBJECTS AND SUMMARY OF THE INVENTION

An object of the invention is overcome the drawbacks of the prior art.

Another object of the invention is to provide a calibrating sleeve that has a simple design in comparison to the known calibrating sleeves, yet effectively seals the vacuum tank from the environment at the inlet head, prevents the entering, extruded plastic pipe from compressing, and is absolutely circular at each adjusted diameter.

These and other objects are achieved according to the invention by an infinitely adjustable calibration sleeve for extruded plastic pipes, including an inlet head and two strap layers. The two strap layers cross each other like a lattice grate and are linked to each other at crossing points. The inlet head and the strap layers being adjustable to a pipe diameter, the inlet head including radially adjustable, overlapping segments, the overlapping segments lying in a radial plane and being distributed over a perimeter of the plastic pipe to be calibrated. The overlapping segments mesh in respective overlapping regions. Slots are provided in the overlapping regions, and faces of the segments are configured to lie on the plastic pipe to be calibrated, in use. The two strap layers are linked to the overlapping segments flush with the faces of the segments.

The radially adjustable segments in the inventive inlet head allow the inlet of the calibration sleeve to be precisely adjusted to the pipe diameter to be calibrated, i.e., the segments and the two strap layers are simultaneously adjusted in a coordinated manner to the diameter to be calibrated. This prevents deformations of the extruded plastic pipe in the inlet area of the calibration sleeve. This has a positive effect on the surface quality of the produced plastic pipes. The faces of the segments formed to rest on the plastic pipe to be calibrated seal the vacuum tank from the environment as they peripherally contact the plastic pipe. A slight out-of-roundness between the peripheral surface formed by the segment faces and the extruded plastic pipe is compensated by the mass of plastic pipe that is still formable at this point in the production process. A type of labyrinth seal is created by the meshing neighboring segments in their slotted overlapping area that improves the seal between the vacuum tank and environment.

In an advantageous embodiment of the invention, pressurized water outlets end in the slots. In this manner an intense cooling of the inlet, as well as the forming of a lubrication film for the gliding cooling of the extruded plastic pipe is provided. In addition, the water film forming in the slots further improves the seal.

As the water outlets are only in the rear slots in the direction of extrusion, the water leaving them is sucked into the vacuum tank, which prevents the water from exiting outward.

Other advantageous embodiments of the invention are found in the additional description found herein.

Relative terms such as left, right, up, and down are for convenience only and are not intended to be limiting.

The invention will be further explained below with reference to an exemplary embodiment. The following are shown in the associated drawing:

DETAILED DESCRIPTION OF THE INVENTION

Figure 1:
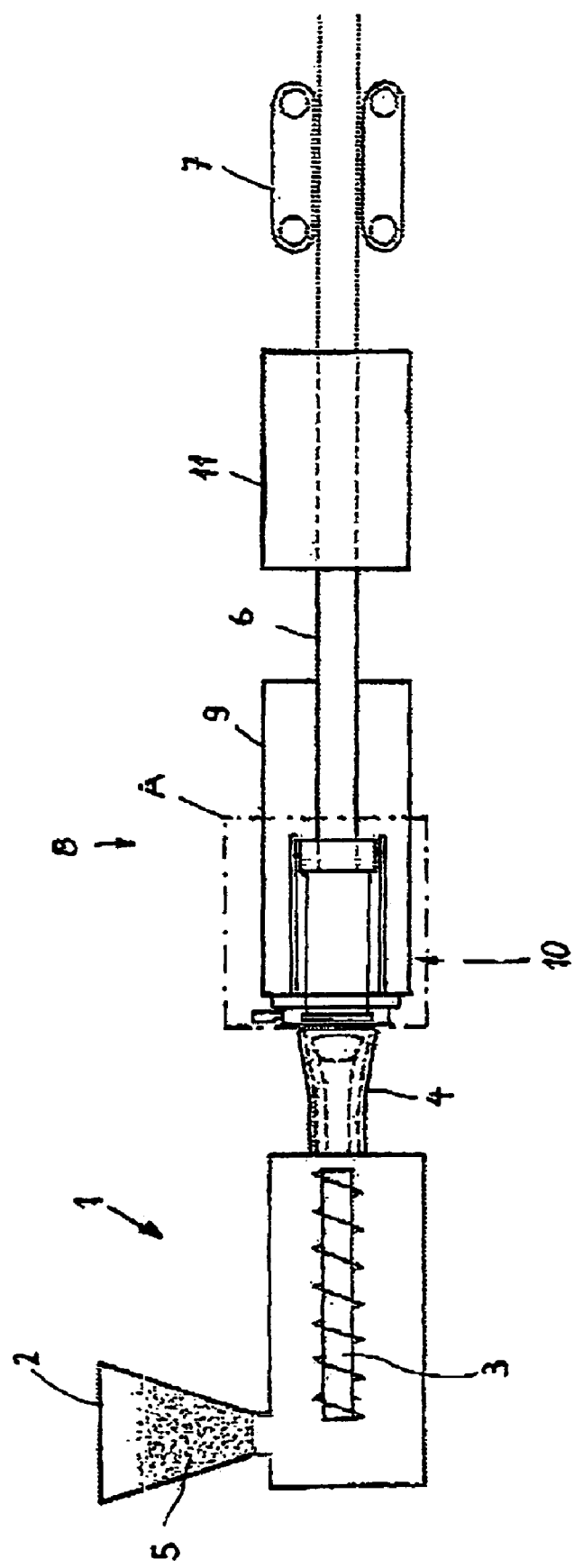
FIG. 1 is a schematic representation of an extrusion system for manufacturing plastic pipes with its main components.
Figure 2:
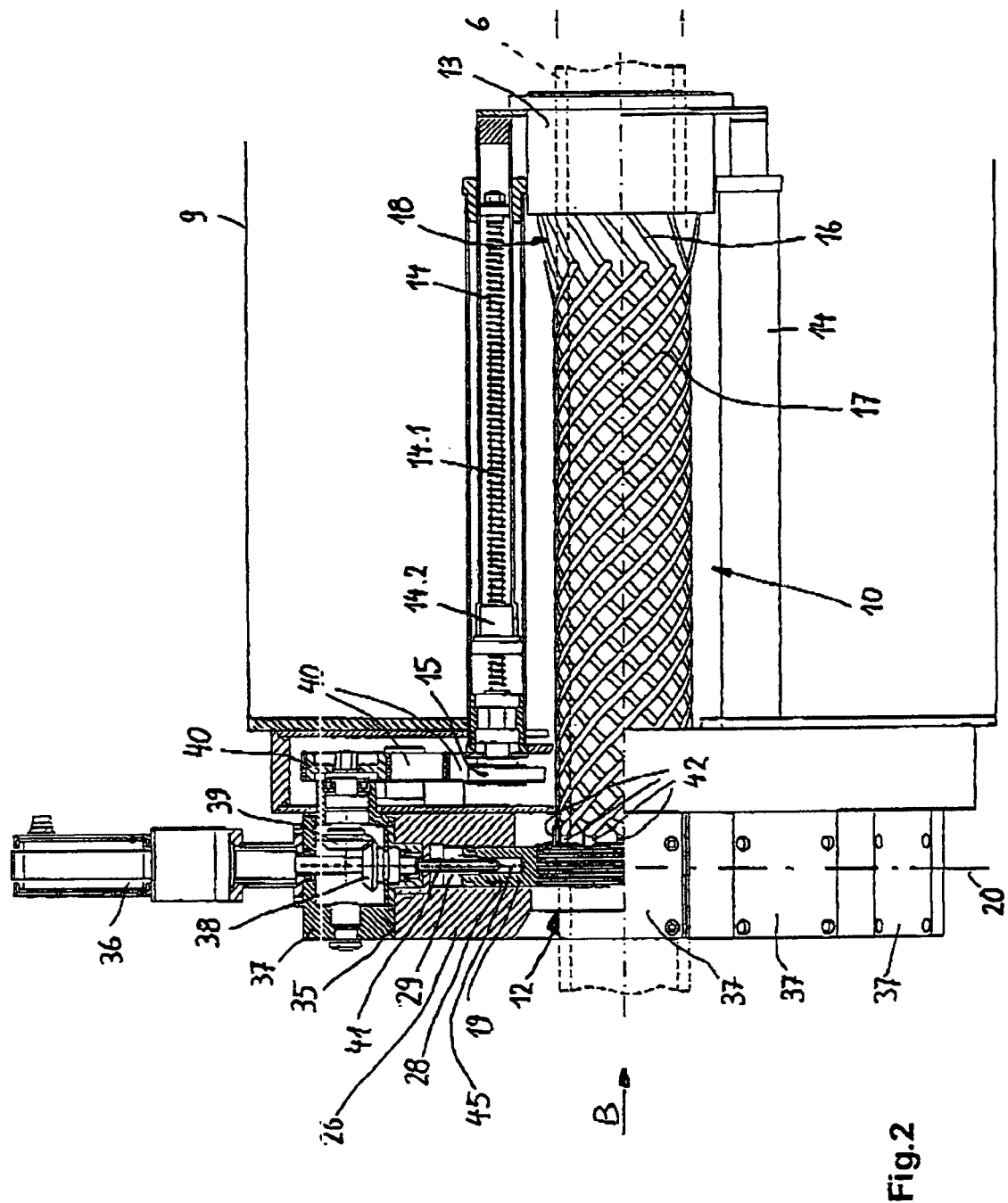
FIG. 2 is an enlarged section A of FIG. 1, partially cut away.

The extrusion system shown in FIG. 1 includes an extruder unit 1 with a feed hopper 2, an extruder feed screw 3, and an extruder die 4. A granular or powdered thermoplastic plastic 5 is supplied to the extruder unit 1 through the feed hopper 2. The granulate or powder is heated, kneaded and plasticized in the extruder unit 1. Then the plastic is conveyed as a formable mass through the extruder feed screw 3 into the extruder die 4 and pressed through an annular gap.

After exiting the extrusion die 4, the hot, still formable pipe 6 is drawn through a calibrating and cooling unit 8 by a transport unit 7, such as one or more conveyor belts, arranged at the end of the extrusion line. The calibrating and cooling unit 8 has a vacuum tank 9 with a perforated calibration sleeve 10 at its entrance. The calibration sleeve 10 has an infinitely adjustable diameter so that the extruded, still-formable pipe 6 can be set to the desired value. After leaving the calibrating and cooling unit 8, the pipe 6 enters a cooling section 11 in which it is cooled to room temperature.

The construction of the calibration sleeve 10 will be described in greater detail below.

The calibrating sleeve 10 possesses an annular inlet head 12 and an annular outlet head 13. While the inlet head 12 is outside of vacuum tank 9, outlet head 13 is inside of vacuum tank 9. The outlet head 13 has a fixed inner diameter which at least corresponds to the largest pipe diameter to pass through the extrusion system. It can be adjusted in the axial direction of the calibration sleeve 10 in reference to the fixed inlet head 12. At least two spindle units 14 are provided whose threaded spindles 14.1 are driven by means of an unillustrated motor and a toothed belt 15. The outlet head 13 is connected by spindle nuts 14.2. Depending on the drive direction of the threaded spindles 14.1, the outlet head 13 moves either toward or away from the inlet head 12.

In between inlet head 12 and outlet head 13 are two strap layers 16, 17 that cross like a lattice grate and are linked to each other at the crossing points. The two strap layers 16, 17 form a perforated hollow cylinder. While only the straps of layer 16 are linked to the outlet head 13, both strap layers 16, 17 are linked to the inlet head 12 in a manner that will be described later. The diameter of the hollow cylinder formed by strap layers 16, 17 can be changed by axially adjusting the outlet head 13 via the spindle units 14. The diameter is increased by adjusting the outlet head 13 towards the inlet head 12, and the diameter of the hollow cylinder is decreased by moving the outlet head 13 away from the inlet head 12. Depending on the degree of extension, there is a more or less conical transition 18 at the transition to the outlet head 13. Such a conical transition should be and is avoided at the inlet head 12 by its construction which will be described in greater detail below.

Figure 3:
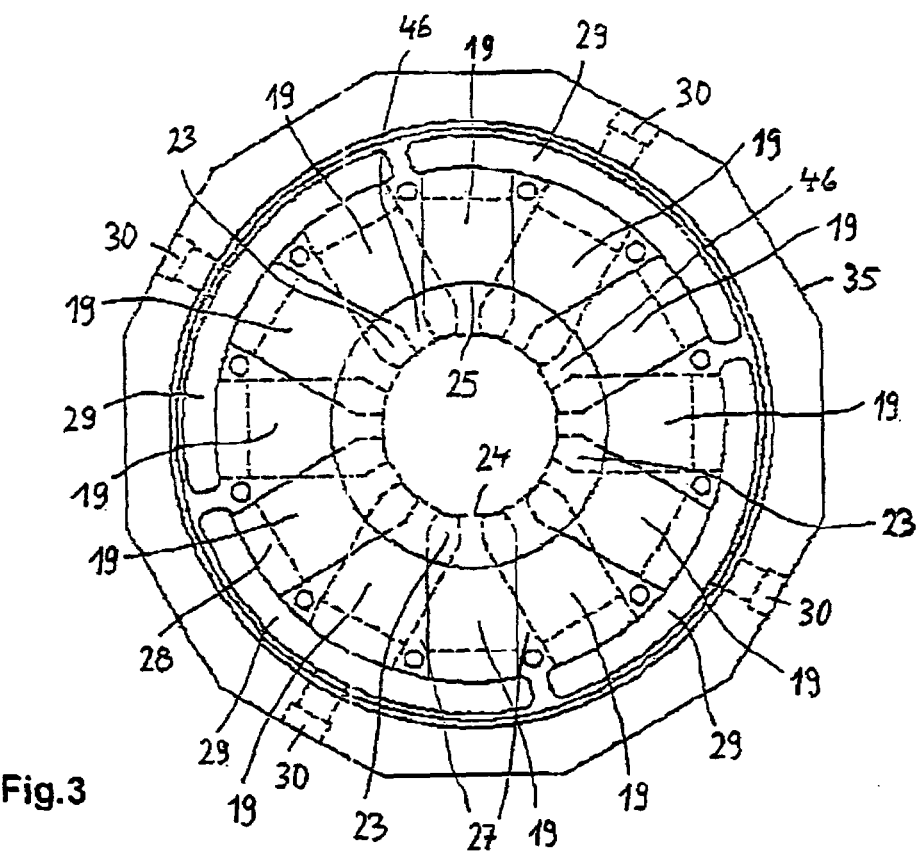
FIG. 3 is a view in the direction of arrow B of FIG. 2 of the housing of the inlet head of the calibration sleeve.
Figures 4, 5:
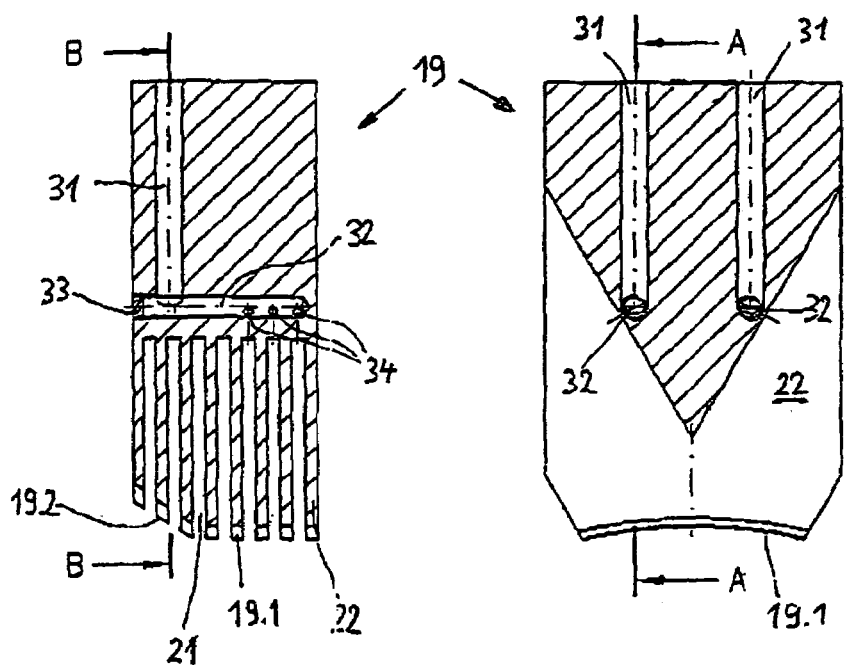
FIG. 4 is section A—A of a segment of FIG. 5.
FIG. 5 is section B—B of a segment of FIG. 4.

The inlet head 12 includes twelve radially adjustable segments 19 that are evenly distributed in a radial plane 20 over the perimeter of pipe 6 to be calibrated. The bottom areas of these segments 19 overlap as shown in FIG. 3 where the overlapping regions or areas are given reference number 23. In these overlapping areas 23, segments 19 are provided with slots 21 that are delimited by bars 22 as best seen in FIG. 4. The slots 21 and bars 22 of neighboring segments 19 mesh in the overlapping areas 23. To remain in the radial plane 20, segments 19 are alternately offset from each other by a slot 21 or bar 22 in the direction of extrusion or against the direction of extrusion.

As can be seen in FIG. 4, the three front bars 22 of each segment 19 have an inlet bevel 19.2 to make it easier for an extruded pipe 6 to enter the inlet head 12.

The segments 19 can be radially adjusted within the bounds of an inner circle 24 and an outer circle 25 (FIG. 3). The inner circle 24 represents the smallest diameter of a pipe 6 to be calibrated, and the outer circle 25 represents in the largest diameter of a pipe 6 to be calibrated. The faces 19.1 of the segments 19 have a radius that corresponds to the largest diameter of a pipe 6 that can be manufactured with the respective calibration sleeve.

The segments 19 are mounted in a housing 26 having lateral guides 27 (FIG. 3) for the segments 19. The guide shafts 28 of the segments 19 in the housing 26 end directly in the water chambers 29 that are supplied with pressurized water via feed lines 30. Each group of three segments 19 is assigned a separate water chamber 29. Each segment 19 possesses two radial channels 31 whose outer ends communicate with an assigned water chamber 29, and whose inner ends terminate in an axial branch duct 32 that ends as a blind hole in the direction of extrusion, and whose opposite end terminating outside is sealed by a plug 33. Water outlets 34 lead from the branch ducts 32 into the rear three slots 21 viewed in the direction of extrusion 21.

The stepless, infinite radial adjustment of the segments 19 is carried out by an electric motor 36 that is flanged to a gearbox 37. The gearbox 37 is affixed to one of twelve (12) polygonal surfaces 35 of the housing 26 of the inlet head 12 (FIG. 3). Each of the 12 polygonal surfaces 35 is assigned such a gearbox 37 (the gearboxes 37 are not shown in FIG. 3). Only one of the gearboxes 37 is driven directly by the motor 36. The gears of the other gearboxes 37 are driven by meshing spur gears 38, 39 and meshing toothed wheels 40 that are seated on the same shaft as the spur gears 39 and drive the spur gears 39 of the other gearboxes 37. In each gearbox 37, the spur gears 38 are tightly seated on a threaded spindle 41 that is screwed into a thread 45 of the segments 19. The segments 19 move either inward or outward depending on the direction in which the driven spur gears 38 rotate.

Figure 6:
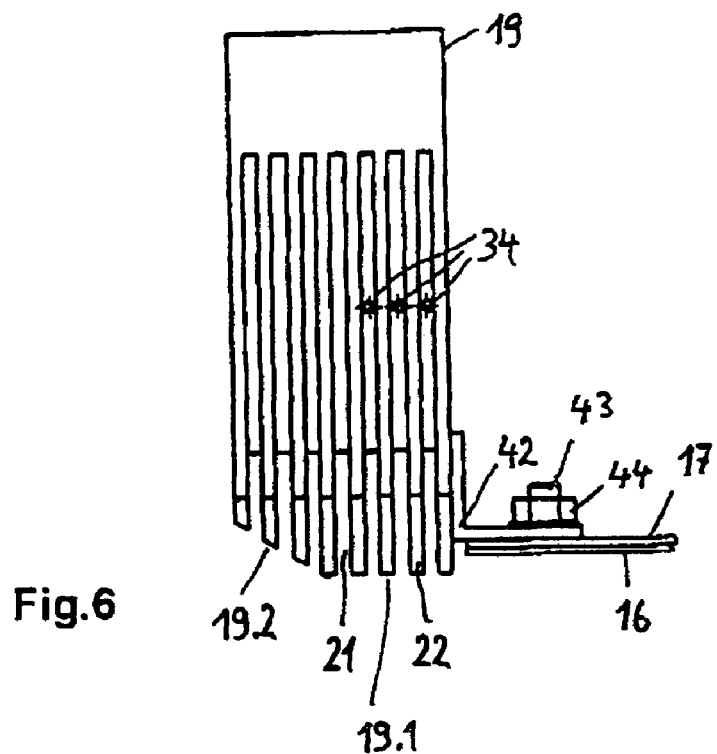
FIG. 6 is a side view of a segment with the fastening site for the strap layers of the calibration sleeve.
Figure 7:
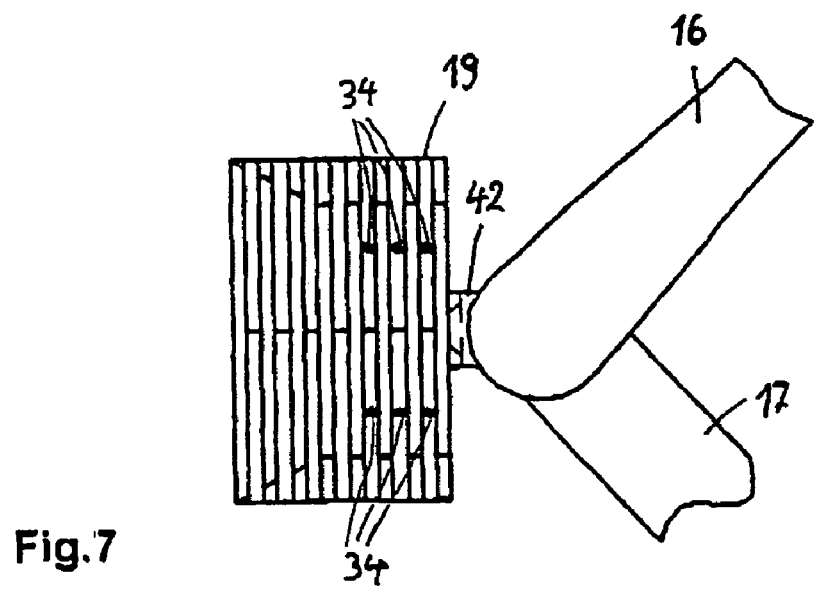
FIG. 7 is a bottom view of FIG. 6.

Fixing brackets 42 are screwed onto the sides of the segments 19 facing the outlet head 13 at a bottom, non-overlapping area 46 (see FIG. 3). The fixing brackets link strap layers 16, 17 to segments 19 as shown in FIGS. 6 and 7. The ends of the inner strap layers 16 facing the segments 19 are provided with a welded bolt 43 that penetrates holes in the outer strap layer 17 and the fixing bracket 42, and are loosely screwed/bolted together with a nut 44. The fixing brackets 42 are mounted on the segments 19 such that there is only a slight radial step between the inner strap layers 16 and the faces 19.1 of the segments 19, if there is any at all.

The described calibration sleeve 10 is infinitely adjustable over a large diameter and allows the dimension of the plastic pipe 6 which is produced to be changed during production. When the dimension of the diameter is changed, the spindle units 14 and the spur gears 38 in the gearboxes 37 are simultaneously driven, i.e., the segments 19 and the strap layers 16, 17 are adjusted simultaneously in a coordinated manner. At inlet head 12, this produces an inner diameter that is always essentially identical with the inner diameter of the hollow cylinder formed by the strap layers 16, 17. The faces 19.1 of the segments 19 lie on the surface of the extruded pipe 6 and, hence, seal the reduced pressure in the vacuum tank 9 from the environment. The pressurized water guided through the water chambers 29 and channels 31, 32 as well as the water outlets 34 in the slots 21 of the segments 19 intensely cool the inlet head 12 and form a lubricating film for the gliding cooling of the extruded pipe 6 and also improve the seal of the vacuum tank 9.

The throughput and the water pressure and, hence, the pressure exerted by the water on the extruded pipe 6 can be adjusted depending on the plastic, the pipe dimension, and the vacuum in the vacuum tank 9. The four water chambers 29 supply a specific selective pressure.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. Infinitely adjustable calibration sleeve for extruded plastic pipes, comprising:
   a) an inlet head;
   b) two strap layers, the two strap layers crossing each other like a lattice grate and being linked to each other at crossing points;
   c) the inlet head and the strap layers being adjustable to a pipe diameter;
   d) the inlet head including radially adjustable, overlapping segments, the overlapping segments lying in a radial plane and being distributed over a perimeter of the plastic pipe to be calibrated, and the overlapping segments meshing in respective overlapping regions;
   e) slots being provided in the overlapping regions; and faces of the segments being configured to lie on the plastic pipe to be calibrated, in use; and
   f) the two strap layers being linked to the overlapping segments flush with the faces of the segments.

2. Calibration sleeve according to claim 1, wherein:
   a) pressurized water outlets are provided, the pressurized water outlets opening into the slots.

3. Calibration sleeve according to claim 2, wherein:
   a) the pressurized water outlets are only in rear ones of the slots in the direction of extrusion.

4. Calibration sleeve according to claim 2, wherein:
   a) the pressurized water outlets are supplied with water via a channel system of the overlapping segments connected to a pressurized water source, in use.

5. Calibration sleeve according to claim 4, wherein:
   a) the overlapping segments are connected in groups to the pressurized water source, in use.

6. Calibration sleeve according to claim 1, wherein:
   a) the overlapping segments have an inlet bevel.

7. Calibration sleeve according to claim 1, wherein:
   a) each one of the overlapping segments is assigned a gearbox to radially adjust the segment, and each gearbox is driven by an electric motor.

8. Calibration sleeve according to claim 1, wherein:
   a) the two strap layers are linked to the overlapping segments by fixing brackets extending axially from the overlapping segments; and
   b) the two strap layers connect substantially flush with the faces of the overlapping segments.

* * * * *